United States Patent
Yumura

(10) Patent No.: US 11,173,846 B2
(45) Date of Patent: Nov. 16, 2021

(54) VEHICLE CONSOLE

(71) Applicant: Toyota Jidosha Kabushiki Kaisha, Toyota (JP)

(72) Inventor: Jun Yumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/783,620

(22) Filed: Feb. 6, 2020

(65) Prior Publication Data
US 2020/0290518 A1    Sep. 17, 2020

(30) Foreign Application Priority Data

Mar. 12, 2019   (JP) .............................. JP2019-044399

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC combination set(s) only.
See application file for complete search history.

(56) References Cited

U.S. PATENT DOCUMENTS

| 2006/0066118 | A1* | 3/2006 | Radu | B60R 7/04 296/37.8 |
| 2017/0259749 | A1* | 9/2017 | Okinaga | B60R 7/08 |
| 2020/0247323 | A1* | 8/2020 | Smolik | B60N 2/793 |

FOREIGN PATENT DOCUMENTS

| JP | 2006232190 A | * | 9/2006 |
| JP | 2009-202851 A | | 9/2009 |
| JP | 2011-218913 A | | 11/2011 |
| JP | 2016-049823 A | | 4/2016 |

* cited by examiner

*Primary Examiner* — Lori L Lyjak
(74) *Attorney, Agent, or Firm* — Dinsmore & Shohl LLP

(57) ABSTRACT

A water barrier wall is disposed along the boundary between a tray and a console box so as to extend in the vehicle width direction and so as to project further upward than the rear end portion of the tray. The water barrier wall has a cutout whose bottom surface is positioned lower than the upper end of the water barrier wall. The cutout penetrates the water barrier wall in the front-back direction. The cutout is positioned displaced from an electrical component in the vehicle width direction. The bottom surface of the cutout is positioned higher than the upper end of the console box.

4 Claims, 4 Drawing Sheets

VEHICLE CONSOLE

CROSS REFERENCE TO RELATED APPLICATION

This application claims priority to Japanese Patent Application No. 2019-044399 filed on Mar. 12, 2019, which is incorporated herein by reference in its entirety including the specification, claims, drawings, and abstract.

TECHNICAL FIELD

The present disclosure relates to a vehicle console that is disposed on the floor panel of a vehicle between a driver seat and a passenger seat so as to extend in the front-back direction and has a flat tray disposed forwardly adjacent to a console box for placement of an object thereon.

BACKGROUND

Some vehicles have a vehicle console having a cup holder with a shutter, in which the cup holder is provided forward of a console box, and the shutter is to be fully opened to be stored in a space between the cup holder and the console box. In such a vehicle, an occupant of the vehicle putting or picking up a cup filled with liquid in or from the cup holder may spill the liquid over the shutter adjacent to the cup holder. In such a case, the liquid spilled over the shutter may flow into the inside of the console box behind the shutter, possibly wetting with the liquid and thereby damaging an electrical component on the inside front wall of the console box. In order to prevent such damage of an electrical component due to liquid, JP No. 2016-049823A discloses a vehicle center console that has a water barrier wall extending in the vehicle width direction between a shutter and a console box to block the liquid spilled over the upper surface of the shutter to thereby prevent the liquid from flowing to the inside of the console box.

SUMMARY

However, in a case where a large amount of liquid is spilled over the upper surface of the shutter, the liquid may overflow the water barrier wall to flow into the inside of the console box despite provision of a water barrier wall between the shutter and the console box so as to extend in the vehicle width direction, like one in JP No. 2016-049823A. Consequently, in some cases an electrical component on the inside front wall of the console box may be wet with the liquid and thereby damaged. Such damage of electrical components due to liquid can be caused with a vehicle console having a flat tray for placement of an object on its upper surface, disposed forwardly adjacent to a console box and a cup holder disposed adjacent to the tray, for example, when an occupant putting or picking up a cup filled with liquid in or from the cup holder carelessly spills the liquid over the upper surface of the tray.

To address the above, the present disclosure aims to prevent wetting of an electrical component on the inside front wall of a console box with liquid spilled over the upper surface of a tray disposed forwardly adjacent to a console box.

According to one aspect of the present disclosure, there is provided a vehicle console disposed on the floor panel of a vehicle between the driver seat and a passenger seat so as to extend in the front-back direction, the vehicle console including a console box having a box shape open on an upper side thereof and allowing storage of an object therein; a flat tray disposed forwardly adjacent to the console box and allowing placement of an object on the upper surface thereof; an electrical component disposed on the inside front wall of the console box; and a water barrier wall disposed along the boundary between the tray and the console box so as to extend in the width direction of the vehicle and so as to project further upward than the upper surface of the end portion of the tray, wherein the water barrier wall has a cutout whose bottom surface is positioned lower than the upper end of the water barrier wall, the cutout penetrating the water barrier wall in the front-back direction, the cutout is positionally displaced from the electrical component in the vehicle width direction, the bottom surface of the cutout is positioned higher than the upper end of the console box, and the cutout guides liquid flowing from the tray to the inside of the console box.

Since a cutout penetrating the water barrier wall in the front-back direction is formed at a position displaced from an electrical component in the vehicle width direction, as described above, the liquid spilled over the upper surface of the tray will flow through the cutout, displaced from the electrical component in the vehicle width direction, into the inside of the console box. This makes it possible to prevent wetting of the electrical component on the inside front wall of the console box with the liquid.

In one embodiment of the present disclosure, the respective upper surfaces of the right side portion, the left side portion, and the front portion of the tray of the vehicle console may be positioned higher than the upper surface of the tray, the upper surface of the tray may be inclined such that the rear portion thereof is positioned lower than the front portion thereof, and the height of the bottom surface of the cutout may be the same as or lower than the height of the upper surface of the rear end portion of the tray.

In this embodiment, the liquid spilled over the upper surface of the tray does not flow to any of the right, the left, and the forward side of the tray, but flows rearward of the tray to flow through the cutout into the inside of the console box. This makes it possible to prevent dropping of the liquid spilled over the upper surface of the tray onto the floor panel, and to guide the liquid so that the liquid flows into the cutout.

In one embodiment of the present disclosure, the vehicle console may further include a console cover for opening and closing the open end of the console box, wherein the console cover may cover the space above the water barrier wall when being closed, and the cutout may allow disposal of a cable therein, the cable connecting an object on the upper surface of the tray to the inside of the console box.

In this embodiment, it is possible to close the console cover with an object, such as a smart phone, resting on the upper surface of the tray and connected to an electrical component inside the console box via a cable when the cable is disposed passing through the cutout.

According to the present disclosure, it is possible to prevent wetting of an electrical component on the inside front wall of a console box with liquid spilled over the upper surface of a tray disposed forwardly adjacent to the console box.

BRIEF DESCRIPTION OF DRAWINGS

Embodiment(s) of the present disclosure will be described based on the following figures, wherein.

DESCRIPTION OF EMBODIMENTS

A vehicle console 10 according to an embodiment will now be described with reference to the accompanying drawings. In the respective drawings to be described below, the arrows FR, UP, and RH indicate the forward (ahead), upward, and rightward directions, respectively, of a vehicle, and the opposite directions of these arrows FR, UP, RH indicate the rearward, downward, and leftward directions, respectively, of the vehicle. Simple reference to the front or back, right or left, or up or down direction in the following description is assumed to indicate one in the front-back direction, the right-left direction (or the vehicle width direction), or the up-down direction of a vehicle, respectively, unless otherwise stated.

Figure 1:
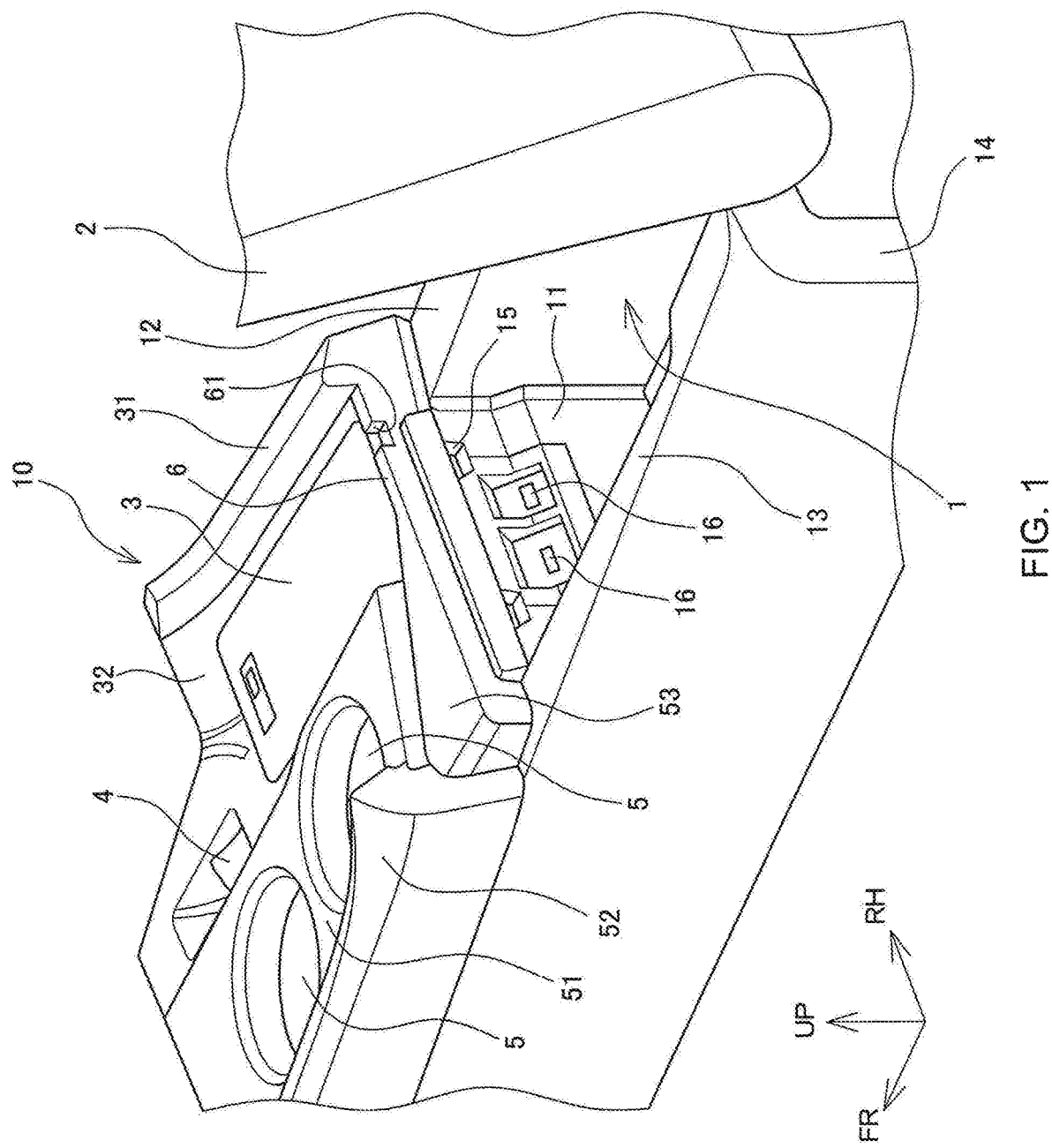
FIG. 1 is a perspective view of a vehicle console according to an embodiment of the present disclosure with a console cover open.

FIG. 1 is a perspective view of the vehicle console (hereinafter simply referred to as the console) 10 that is disposed on the floor panel of a vehicle between the driver seat and a passenger seat so as to extend in the front-back direction. In FIG. 1, only the console 10 is illustrated with the driver seat and the passenger seat not illustrated.

As illustrated in FIG. 1, a console box 1 is disposed at the back of the console 10. The console box 1 is a box that is enclosed by a front wall 11, a right wall 12, a left wall 13, and a rear wall 14, and open on its upper side. The console box 1 has an interior space for storage of an object therein. The console box 1 has a console cover 2 to therewith close or open the open end of the console box 1. The console cover 2 is supported on the rear wall 14 of the console box 1 so as to pivot in the up-down direction. The console box 1 has a latch, not illustrated, provided to its front end portion. With the latch fit in a fitting hole 15 on the front wall 11 of the console box 1, the console cover 2 can securely close the open end of the console box 1. The front wall 11, or the inside wall of the console box 1 on the front side, has two USB ports 16, or electrical components, formed thereon.

Figure 2:
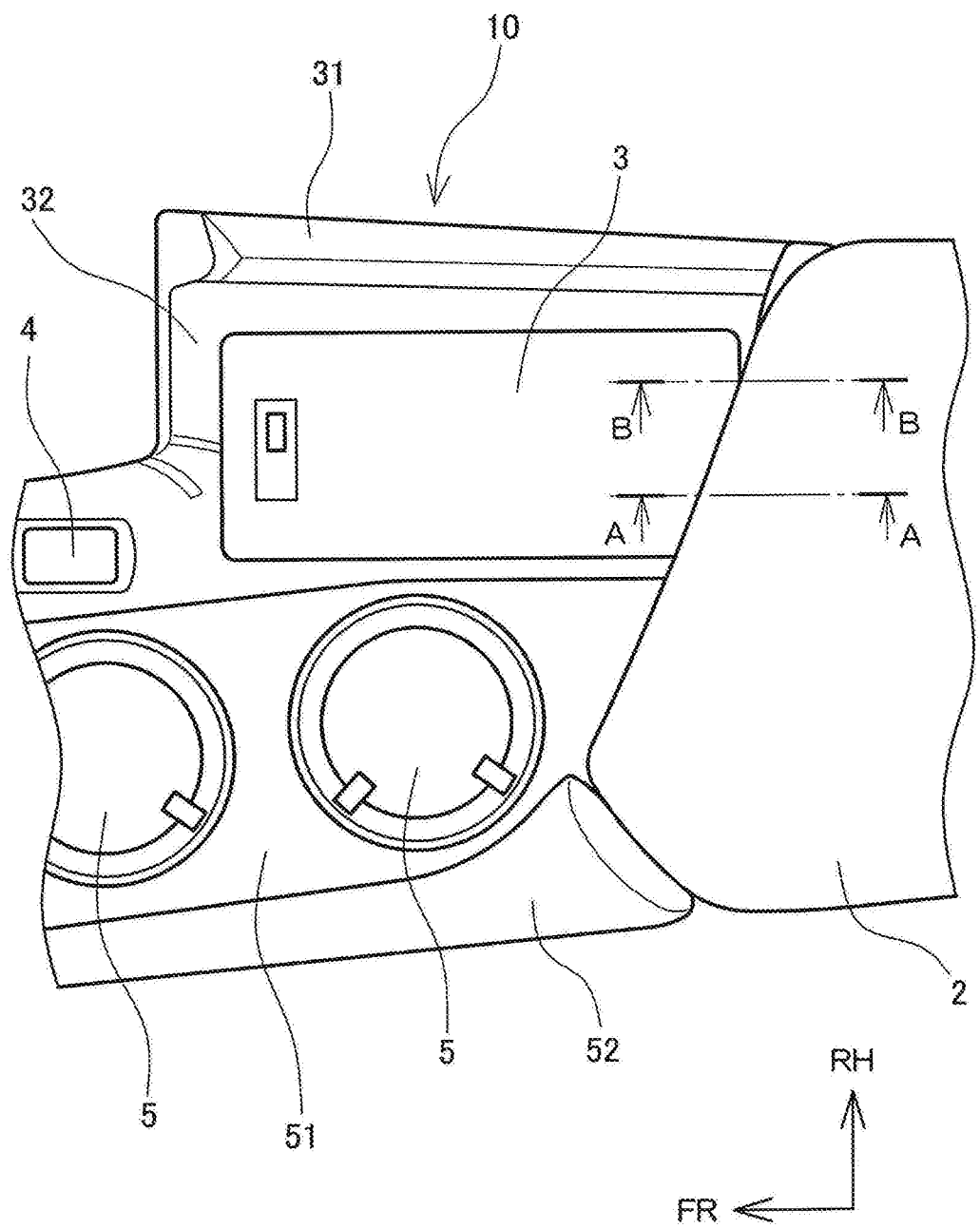
FIG. 2 is a plan view of a vehicle console according to fin embodiment with a console cover closed, viewed from above.

As illustrated in FIG. 1 and FIG. 2, a flat tray 3 is disposed forwardly adjacent to the console box 1, so that an object, such as a smart phone, can be placed on die upper surface of the tray 3. A right side portion 31 is formed to the right of the tray 3 so as to extend upward the upper surface of the tray 3. Further, a cup-holder upper surface 51 is provided to the left of the tray 3 at a position higher than the upper surface of the tray 3. Further, a front portion 32 is formed forward of the tray 3 so as to extend upward the upper surface of the front end of the tray 3.

A shift lever (not illustrated) for switching gears of the transmission of the vehicle is disposed ahead of the right side portion 31 and the front portion 32. Further, a switch 4 for switching the running mode of the vehicle between an economy mode and a power mode is disposed ahead of the tray 3 and to the left of the shirt lever. The upper surface of the console 10 between the tray 3 and the switch 4 is inclined at an angle of five degrees such drat the rear portion of the upper surface is positioned lower than its front portion.

Two cup holders 5 are provided to the left of the tray 3 and the switch 4 so as to be aligned in the front-back direction. Each cup holder 5 is a cylindrical concavity that is recessed downward from the cup-holder upper surface 51. Each cup holder 5 can prevent a cylindrical cup or can placed inside thereof from falling down even when the vehicle accelerates, decelerates, or turns while running. A left side portion 52 is formed to the left of the cup holders 5 so as to extend upward the cup-holder upper surface 51. A cup-holder rear portion 53, or a flat surface, is formed behind the cup-holder upper surface 51 at a position lower than the cup-holder upper surface 51.

Figure 3:
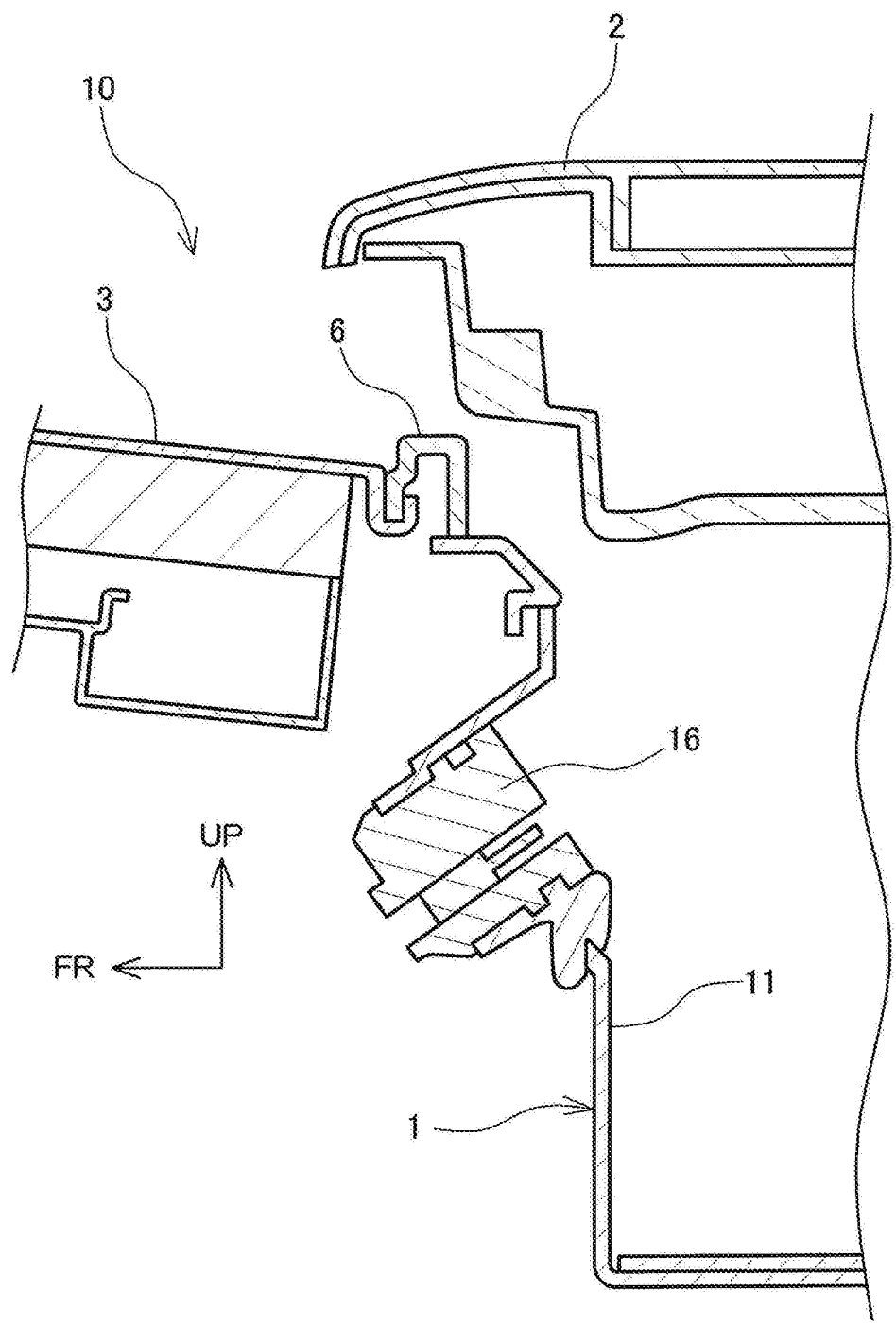
FIG. 3 is a cross sectional view along line A-A in FIG. 2.

FIG. 3 is a cross sectional view along line A-A in FIG. 2, illustrating a cross section including that of the USB port 16 formed on the from wall 11 of the console box 1. As illustrated in FIG. 3, the upper surface of the tray 3 is flat and inclined at an angle of five degrees such that its rear portion is positioned lower than its front portion.

As illustrated in FIG. 1 and FIG. 3, a water barrier wall 6 is disposed along the boundary between the tray 3 and the console box 1 so as to extend in the width direction of the vehicle. As illustrated in FIG. 3, the water barrier wall 6 projects further upward than the upper surface of the rear end portion of the tray 3. With the console cover 2 closed, the console cover 2 covers the space above the water barrier wall 6.

As illustrated in FIG. 1, the water barrier wall 6 has a cutout 61 whose bottom surface is positioned lower than the upper end of the water barrier wall 6. The cutout 61 penetrates the water barrier wall 6 in the front-back direction at a position displaced from the USB port 16 in the width direction of the vehicle. The cutout 61 has a function of feeding the liquid flowing out from the tray 3 to the inside of the console box 1, as will be described later.

Figure 4:
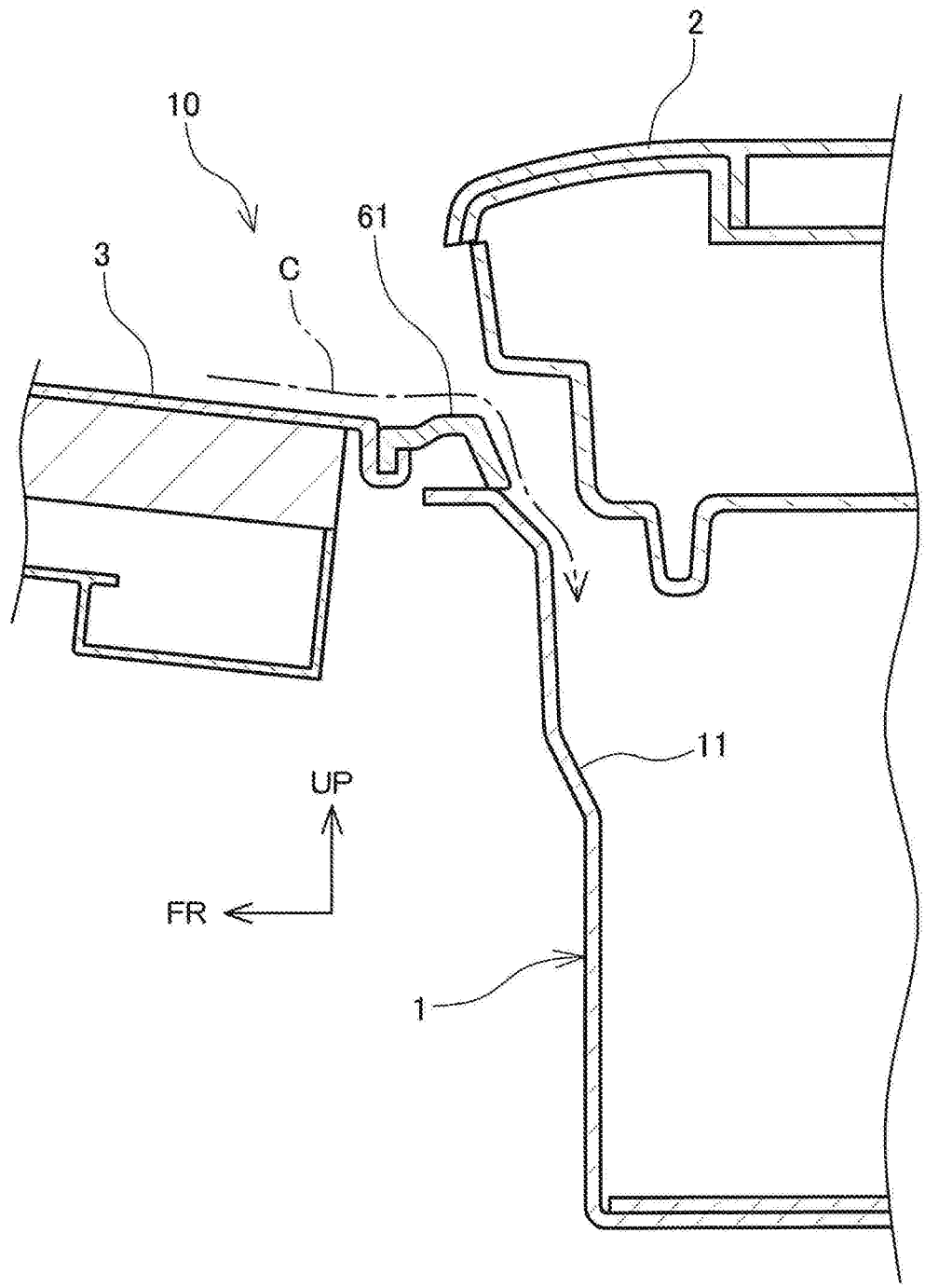
FIG. 4 is a cross sectional view along line B-B in FIG. 2.

FIG. 4 is a cross sectional view along line B-B in FIG. 2, illustrating a cross section including that of the cutout 61 of the water barrier wall 6. As illustrated in FIG. 4, the height of the bottom surface of the cutout 61 is the same as the height of the upper surface of the rear end portion of the tray 3. Alternatively, the height of the bottom surface of tire cutout 61 can be lower than the height of the upper surface of the rear end portion of the tray 3. The bottom surface of the cutout 61 is positioned higher than the upper end of the console box 1.

As described above, the upper surfaces of the right side portion 31 and the front portion 32 are positioned higher than the upper surface of the tray 3, and the cup-holder upper surface 51 is positioned higher than the upper surface of the tray 3. The upper surface of the tray 3 is inclined at an angle of five degrees such that its rear portion is positioned lower than its front portion. Moreover, the upper surface of the console 10 between the tray 3 and the switch 4 is inclined at an angle of five degrees such that its rear portion is positioned lower than its front portion. With this inclination, any liquid carelessly spilled over the upper surface of the tray 3 by an occupant of the vehicle when putting or picking up a cup filled with liquid in or from the cup holder 5 will not flow to the right, left, or forward side of the tray 3, and thus will not drop onto the floor panel but will flow rearward of the tray 3. Since the height of the bottom surface of the cutout 61 is the same as that of the rear end portion of the tray 3; that is, higher than the height of the upper end of the console box 1, the liquid flowing rearward will be guided to the cutout 61 to flow through the cutout 61 to the inside of the console box 1. This flow of liquid from the upper surface of the tray 3 through the cutout 61 into the inside of the console box 1 is indicated in FIG. 4 by an arrow C drawn with an alternate long and short dash line. Since the cutout 61 is positioned displaced from the USB port 16 in the vehicle width direction, as described above, the liquid flowing through the cutout 61 resultantly flows down on the front wall 11 at a position away from the USB port 16 into the inside of the console box 1. Consequently, it is possible to prevent wetting of the USB port 16 on the front wall 11 of the console box 1 with the liquid spilled over the upper surface of the tray 3.

In addition, even if any liquid should be spilled over the upper surface of the tray 3, as described above, the liquid will not drop to the floor panel but can be pooled inside the console box 1. With the above, the floor carpet can be saved from being wet, and an occupant of the vehicle can wipe up the liquid pooled inside the console box 1.

In the case where an object (not illustrated), such as a smart phone, is connected via a cable (not illustrated) to the USB port 16 inside the console box 1, the cable can pass through the cutout 61, as the depth and the width of the cutout 61 in the width direction of the vehicle are larger than the outer diameter of the cable. That is, the cutout 61 allows disposal therein of a cable extending from an object on the upper surface of the tray 3 to the inside of the console box 1. This makes it possible to keep the console cover 2 closed with the cable passing through the cutout 61 even in the case where an object, such as a smart phone, is placed on the tray 3 and connected to the USB port 16 inside the console box 1 via the cable. For example, when the console cover 2 is closed with a smart phone resting on the upper surface of the tray 3 and connected to the USB port 16 via a cable, an occupant in the driver seat or the passenger seat can use the closed console cover 2 as an arm rest while having the smart phone, connected to the USB port 16 via a cable, at a position within the occupant's field of view.

The vehicle console disclosed in the present disclosure is not limited to the above described format, and can be implemented in a variety of formats within the gist of the present disclosure. For example, air electrical component on the inside front wall of the console box is not limited to a USB port, but can be a power connector at DC12V or a socket outlet at AC100V.

The invention claimed is:

1. A vehicle console disposed on a floor panel of a vehicle between a driver seat and a passenger seat so as to extend in a front-back direction, the vehicle console comprising:
   a console box having a box shape open on an upper side thereof and allowing storage of an object therein;
   a flat tray disposed forwardly adjacent to the console box and allowing placement of an object on an upper surface thereof;
   an electrical component disposed on an inside front wall of the console box; and
   a water barrier wall disposed along a boundary between the tray and the console box so as to extend in a width direction of the vehicle and so as to project further upward than an upper surface of an end portion of the tray,
   wherein
   the water barrier wall has a cutout whose bottom surface is positioned lower than an upper end of the water barrier wall, the cutout penetrating the water barrier wall in a front-back direction,
   the cutout is positionally displaced from the electrical component in a vehicle width direction,
   the bottom surface of the cutout is positioned higher than an upper end of the console box, and
   the cutout guides liquid flowing from the tray to an inside of the console box.

2. The vehicle console according to claim 1, wherein respective upper surfaces of a right side portion, a left side portion, and a front portion of the tray of the vehicle console are positioned higher than an upper surface of the tray,
   the upper surface of the tray is inclined such that a rear portion thereof is positioned lower than a front portion thereof, and
   a height of the bottom surface of the cutout is the same as or lower than a height of an upper surface of a rear end portion of the tray.

3. The vehicle console according to claim 1, further comprising a console cover for opening and closing an open end of the console box,
   wherein
   the console cover covers the space above the water barrier wall when being closed, and
   the cutout allows disposal of a cable therein, the cable connecting an object on the upper surface of the tray to an inside of the console box.

4. The vehicle console according to claim 2, further comprising a console cover for opening and closing an open end of the console box,
   wherein
   the console cover covers the space above the water barrier wall when being closed, and
   the cutout allows disposal of a cable therein, the cable connecting an object on the upper surface of the tray to an inside of the console box.

* * * * *